US008165321B2

(12) United States Patent
Paquier et al.

(10) Patent No.: US 8,165,321 B2
(45) Date of Patent: Apr. 24, 2012

(54) INTELLIGENT CLIP MIXING

(75) Inventors: Baptiste Pierre Paquier, Saratoga, CA (US); Benjamin Andrew Rottler, San Francisco, CA (US); Aram Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 637 days.

(21) Appl. No.: 12/401,471

(22) Filed: Mar. 10, 2009

(65) Prior Publication Data

US 2010/0232626 A1 Sep. 16, 2010

(51) Int. Cl.
*H04B 1/00* (2006.01)

(52) U.S. Cl. ........................................ 381/119; 381/120

(58) Field of Classification Search .................. 381/119, 381/120

See application file for complete search history.

(56) References Cited

U.S. PATENT DOCUMENTS

| | | | |
|---|---|---|---|
| 6,606,388 | B1 | 8/2003 | Townsend et al. |
| 2005/0201572 | A1 | 9/2005 | Lindahl et al. |
| 2006/0067535 | A1 | 3/2006 | Culbert et al. |
| 2006/0067536 | A1 | 3/2006 | Culbert et al. |
| 2006/0221788 | A1 | 10/2006 | Lindahl et al. |
| 2006/0274905 | A1 | 12/2006 | Lindahl et al. |
| 2009/0006671 | A1 | 1/2009 | Batson et al. |
| 2009/0063521 | A1 | 3/2009 | Bull et al. |
| 2009/0063974 | A1 | 3/2009 | Bull et al. |
| 2009/0063975 | A1 | 3/2009 | Bull et al. |

*Primary Examiner* — Douglas Menz

(74) *Attorney, Agent, or Firm* — Fletcher Yoder PC

(57) ABSTRACT

Various techniques for controlling the playback of secondary audio data on an electronic device are provided. In one embodiment, a secondary audio clip mixing profile is selected based upon the type of audio output device, such as a speaker or a headset, coupled to the electronic device. The selected mixing profile may define respective digital gain values to be applied to a secondary audio stream at each digital audio level of the electronic device, and may be customized based upon one or more characteristics of the audio output device to substantially optimize audibility and user-perceived comfort. In this manner, the overall user listening experience may be improved.

31 Claims, 9 Drawing Sheets

INTELLIGENT CLIP MIXING

BACKGROUND

The present disclosure relates generally to the mixing and playback of multiple audio streams. This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, the growing popularity of digital media has resulted in an increased demand for digital media player devices, which may be portable or non-portable. In addition to providing for the playback of digital media, such as music files, some digital media players may also provide for the playback of secondary media items that may be utilized to enhance the overall user experience. For instance, secondary media items may include voice feedback files providing information about a current primary track that is being played on a device, or may include audio clips associated with an audio user interface (commonly referred to as "earcons"). As will be appreciated, voice feedback data may be particularly useful where a digital media player has limited or no display capabilities, or if the device is being used by a disabled person (e.g., visually impaired).

When mixing voice feedback and/or earcons with a primary audio stream to provide a mixed composite audio output, it may be preferable to increase the output level of the secondary audio stream and/or attenuate the output level of the primary audio stream, such that when the composite audio stream is perceived by a user, the secondary audio data (e.g., voice feedback or earcon) remains audible and intelligible within the composite stream while providing a comfortable listening experience. As will be appreciated, various types of audio output devices may have different response characteristics and, therefore, a user's perception of the audio playback may depend largely on the particular type of audio output device through which the audio playback is being heard.

Conventional techniques for adjusting the output levels of secondary audio streams typically do not take into account the type of audio output device, such as a speaker or headphone/earphone, through which the composite stream is played. For instance, without taking into account the characteristics of an output device, the adjustment of a secondary clip output level may be perceived by a user as being too loud through a particular headphone device, which may cause the user discomfort and/or possibly damage components of the headphone device. Similarly, in some instances, the adjustment of the secondary clip output level may be perceived by a user as being too soft, and thus less intelligible/audible with respect to a concurrently played primary audio stream. Accordingly, in order to enhance the overall user experience with regard to the playback of secondary media data, it may be useful to provide techniques for mixing primary and secondary audio streams that at least partially take into account the characteristics of a particular audio output device through which a user hears the audio output.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for controlling the playback of secondary audio data on an electronic device, such as voice feedback data corresponding to a primary media file or earcons for a system audio user interface. In one embodiment, a plurality of defined secondary clip mixing profiles may be stored on the device. Each clip mixing profile may define corresponding digital gain values for each digital audio level of the electronic device, and may be based on one or more characteristics of a specific type of audio output device (e.g., a specific model of a headphone or speaker). For instance, each clip mixing profile may substantially optimize audibility and comfort from the perspective of a user with regard to a particular type of audio output device. Thus, depending on the particular audio output device coupled to the electronic device, a corresponding clip mixing profile may be selected and applied to an audio processing circuit. Based on the selected clip mixing profile, a corresponding digital gain may be applied to a secondary audio channel during playback of secondary audio data. Accordingly, the amount of the digital gain applied may be customized depending on the type of audio output device that is being utilized by the electronic device for outputting audio data. In this manner, the overall user listening experience may be improved.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
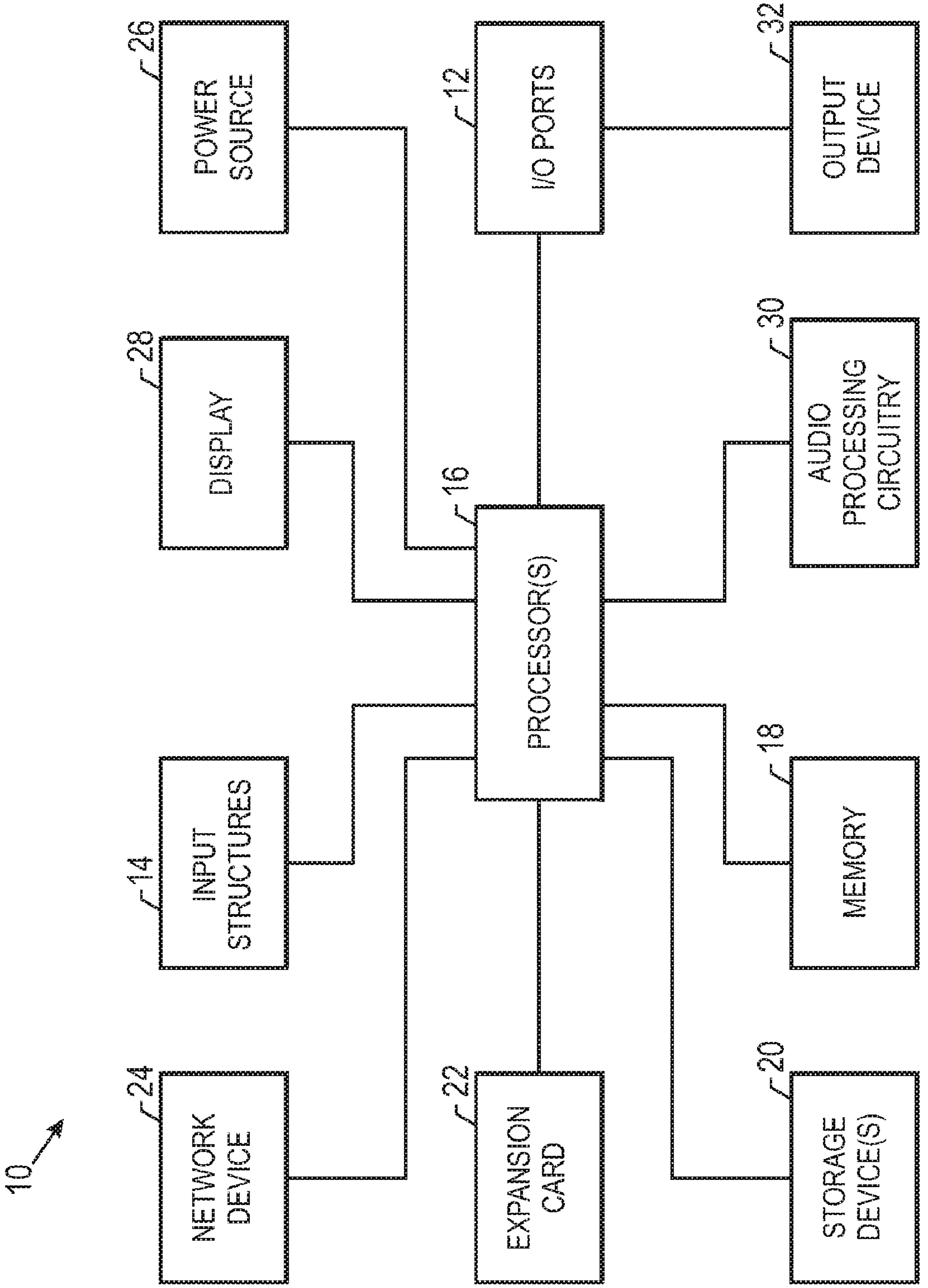
FIG. 1 is a simplified block diagram depicting components of an example of an electronic device that includes audio processing circuitry, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed below, the present disclosure generally provides techniques for controlling the playback of secondary audio data on an electronic device based at least partially upon the type of output device through which the secondary audio data is being directed. For instance, such audio output devices may include various models of headphones or speakers. In accordance with one embodiment, a plurality of secondary audio clip mixing profiles may be determined based on each of a plurality of particular audio output device types. Each clip mixing profile may define specific digital gain values that correspond to each digital audio level of the electronic device. As will be appreciated, the digital gain values may be selected to substantially optimize audibility and comfort from the perspective of a user with regard to a particular type of audio output device. Thus, in operation, based upon the type of audio output device being utilized by the electronic device, a customized clip mixing profile may be selected and applied to the playback of secondary media data on the electronic device. For instance, depending on a current digital audio level, a corresponding digital gain based on the selected clip mixing profile may be applied to a secondary audio stream.

In further embodiments, equalization profiles may be selected for primary and/or secondary audio streams based on the audio output device coupled to the electronic device. Thus, digital gain applied to the secondary audio stream and equalization applied to the primary and/or secondary audio streams may be customized depending on the specific audio output device being used, thereby providing for improved audibility and user comfort and, accordingly, improving the overall user experience.

Before continuing, several of the terms mentioned above, which will be used extensively throughout the present disclosure, will be first defined in order to facilitate a better understanding of disclosed subject matter. For instance, as used herein, the term "primary," as applied to media, shall be understood to refer to a main audio track that a user generally selects for listening whether it be for entertainment, leisure, educational, or business purposes, to name just a few. By way of example only, a primary media file may include music data (e.g., a song by a recording artist) or speech data (e.g., an audiobook or news broadcast). In some instances, a primary media file may be a primary audio track associated with video data and may be played back concurrently as a user views the corresponding video data (e.g., a movie or music video).

The term "secondary," as applied to audio data, shall be understood to refer to non-primary media files that are typically not directly selected by a user for listening purposes, but may be played back upon detection of a feedback event. Generally, secondary media may be classified as either "voice feedback data" or "earcons." "Voice feedback data" or the like shall be understood to mean audio data representing information about a particular primary media item, such as information pertaining to the identity of a song, artist, and/or album, and may be played back in response to a feedback event (e.g., a user-initiated or system-initiated track or playlist change) to provide a user with audio information pertaining to a primary media item being played. Further, it shall be understood that the term "enhanced media item" or the like is meant to refer to primary media items having such secondary voice feedback data associated therewith.

"Earcons" shall be understood to refer to audio data that may be part of an audio user interface. For instance, earcons may provide audio information pertaining to the status of a media player application and/or an electronic device executing a media player application. For instance, earcons may include system event or status notifications (e.g., a low battery warning tone or message). Additionally, earcons may include audio feedback relating to user interaction with a system interface, and may include sound effects, such as click or beep tones as a user selects options from and/or navigates through a user interface (e.g., a graphical interface).

Keeping the above points in mind, FIG. 1 is a block diagram illustrating an example of an electronic device 10 that may utilize the audio mixing techniques disclosed herein, in accordance with one embodiment of the present disclosure. Electronic device 10 may be any type of electronic device that provides for the playback of audio data, such as a portable digital media player, a personal computer, a laptop, a television, mobile phone, a personal data organizer, or the like. Electronic device 10 may include various internal and/or external components which contribute to the function of device 10. Those of ordinary skill in the art will appreciate that the various functional blocks shown in FIG. 1 may comprise hardware elements (including circuitry), software elements (including computer code stored on a computer-readable medium) or a combination of both hardware and software elements.

It should further be noted that FIG. 1 is merely one example of a particular implementation and is intended to illustrate the types of components that may be present in electronic device 10. For example, in the presently illustrated embodiment, these components may include input/output (I/O) ports 12, input structures 14, one or more processors 16, memory device 18, non-volatile storage 20, expansion card(s) 22, networking device 24, power source 26, display 28, audio processing circuitry 30, and audio output device 32. By way of example, electronic device 10 may be a portable electronic device, such as a model of an iPod® or iPhone® available from Apple Inc. of Cupertino, Calif. In another embodiment, electronic device 10 may be a desktop or laptop computer, including a MacBook®, MacBook® Pro, MacBook Air®, iMac®, Mac® Mini, or Mac Pro®, also available from Apple Inc. In further embodiments, electronic device 10 may be a model of an electronic device from another manufacturer that is capable of playing audio data.

I/O ports 12 may include ports configured to connect to a variety of external devices, including audio output device 32. In one embodiment, output device 32 may include headphones or speakers, and I/O ports 12 may include an audio input port configured to couple output device 32 to electronic device 10. By way of example, I/O ports 12, in one embodiment, may include one or more ports in accordance with various audio connector standards, such as a 2.5 mm port, a 3.5 mm port, or a 6.35 mm (¼ inch) port, or a combination of such audio ports. Additionally, I/O port 12 may include a proprietary port from Apple Inc. that may function to charge power source 26 (which may include one or more rechargeable batteries) of device 10, or transfer data, including audio data, to device 10 from an external source.

Input structures 14 may provide user input or feedback to processor(s) 16. For instance, input structures 14 may be configured to control one or more functions of electronic device 10, applications running on electronic device 10, and/or any interfaces or devices connected to or used by electronic device 10. By way of example only, input structures 14 may include buttons, sliders, switches, control pads, keys, knobs, scroll wheels, keyboards, mice, touchpads, and so forth, or some combination thereof. In one embodiment, input structures 14 may allow a user to navigate a graphical user interface (GUI) of a media player application running on device 10 and displayed on display 28. Additionally, input structures 14 may provide one or more buttons allowing a user to adjust (e.g., increase or decrease) the output volume of device 10. Further, in certain embodiments, input structures 14 may include a touch sensitive mechanism provided in conjunction with display 28. In such embodiments, a user may select or interact with displayed interface elements via the touch sensitive mechanism.

Processor(s) 16 may include one or more microprocessors, such as one or more "general-purpose" microprocessors, one or more special-purpose microprocessors and/or application-specific processors (ASICs), or a combination of such processing components. For example, processor 16 may include one or more instruction set processors (e.g., RISC), as well as graphics/video processors, audio processors and/or other related chipsets. For example, processor(s) 16 may provide the processing capability to execute the media player application mentioned above, and to provide for the playback of digital media stored on the device (e.g., in storage device 20).

Instructions or data to be processed by processor(s) 16 may be stored in memory 18, which may be a volatile memory, such as random access memory (RAM), or as a non-volatile memory, such as read-only memory (ROM), or as a combination of RAM and ROM devices. For example, memory 20 may store firmware for electronic device 10, such as a basic input/output system (BIOS), an operating system, various programs, applications, or any other routines that may be executed on electronic device 10, including user interface functions, processor functions, and so forth. In addition, memory 20 may be used for buffering or caching during operation of electronic device 10. Additionally, the components may further include other forms of computer-readable media, such as non-volatile storage device 20, for persistent storage of data and/or instructions. Non-volatile storage 20 may include flash memory, a hard drive, or any other optical, magnetic, and/or solid-state storage media. By way of example, non-volatile storage 20 may be used to store data files, including primary and secondary media data, as well as any other suitable data.

The components depicted in FIG. 1 also include network device 24, which may be a network controller or a network interface card (NIC). In one embodiment, the network device 24 may be a wireless NIC providing wireless connectivity over any 802.11 standard or any other suitable wireless networking standard. Network device 24 may allow electronic device 10 to communicate over a network, such as a Local Area Network (LAN), Wide Area Network (WAN), such as an Enhanced Data Rates for GSM Evolution (EDGE) network for a 3G data network (e.g., based on the IMT-2000 standard), or the Internet. In certain embodiments, network device 24 may provide for a connection to an online digital media content provider, such as the iTunes® music service, available from Apple Inc., through which a user may download media data (e.g., songs, audiobooks, podcasts, etc.) to device 10.

Display 28 may be used to display various images generated by the device 10, including a GUI an operating system or a GUI for the above-mentioned media player application to facilitate the playback of media data. Display 28 may be any suitable display such as a liquid crystal display (LCD), plasma display, or an organic light emitting diode (OLED) display, for example. Additionally, as discussed above, in certain embodiments, display 28 may be provided in conjunction with a touchscreen that may function as part of the control interface for device 10.

As mentioned above and as will be described further detail below, device 10 may store a variety media data types, including primary media data and secondary media data, which may include voice announcements associated with primary media data or earcons associated with an audio user interface. To facilitate the playback of primary and secondary media (either separately or concurrently), device 10 further includes audio processing circuitry 30. In some embodiments, audio processing circuitry 30 may include a dedicated audio processor, or may operate in conjunction with processor(s) 16. Audio processing circuitry 30 may perform a variety functions, including decoding audio data encoded in a particular format, mixing respective audio streams from multiple media files (e.g., a primary and a secondary media stream) to provide a composite mixed output audio stream, as well as providing for fading, cross fading, attenuation, or boosting of audio streams, for example.

As will be appreciated, primary and secondary media data stored on electronic device 10 (e.g., in storage device 20) may be compressed, encoded and/or encrypted in any suitable format. Encoding formats may include, but are not limited to, MP3, AAC or AACPlus, Ogg Vorbis, MP4, MP3Pro, Windows Media Audio, or any suitable format. Thus, to play back media files stored in storage 20, the files may need to be first decoded. Decoding may include decompressing (e.g., using a codec), decrypting, or any other technique to convert data from one format to another format, and may be performed by audio processing circuitry 30. Where multiple media files, such as a primary and secondary media file are to be played concurrently, audio processing circuitry 30 may decode each of the multiple files and mix their respective audio streams in order to provide a single mixed audio stream. In some embodiments, the decoded digital audio data may be converted to analog signals prior to playback. Typically, when a secondary audio stream is played back concurrently with a primary audio stream, some digital gain and/or gain to different frequencies (equalization) of the audio data may be applied to the secondary audio stream in order to make the secondary audio stream more perceivable from a user's point of view. However, at the same time, the secondary audio stream level should not be increased to a point where it may cause a user discomfort and/or damage audio output device 32.

As mentioned above, conventional techniques for controlling the playback of secondary audio streams typically do not take into account the type of audio output device 32 being utilized in conjunction with device 10 for the playback of audio data. As will be appreciated, a user's perception of the audio output may depend largely on the type of audio output device 32 through which the audio output is being heard. That is, various types of output devices 32, including various headphone types (e.g., on-ear headphones, ear buds, in-ear headphones, etc.) and speakers may have different response characteristics. For example, output devices with lower impedances may generally operate at higher rated voltages. Further, a user's perception of the audio output may also depend on the way in which output device 32, e.g., a headphone, interfaces with the user's ear. For instance, in-ear headphones are generally placed at least partially in the ear canal and, thus, may offer superior noise insulation against environmental noise compared to on-ear (also referred to as "over-ear" or "cup") headphones, for example. Thus, as will be discussed in further detail below, in order to enhance the overall user experience with regard to the playback of secondary media data, audio processing circuitry 30 may be configured to provide for the playback of the secondary media data using a secondary audio mixing profile selected based at least partially upon the type of output device 32 coupled to electronic device 10.

Figure 2:
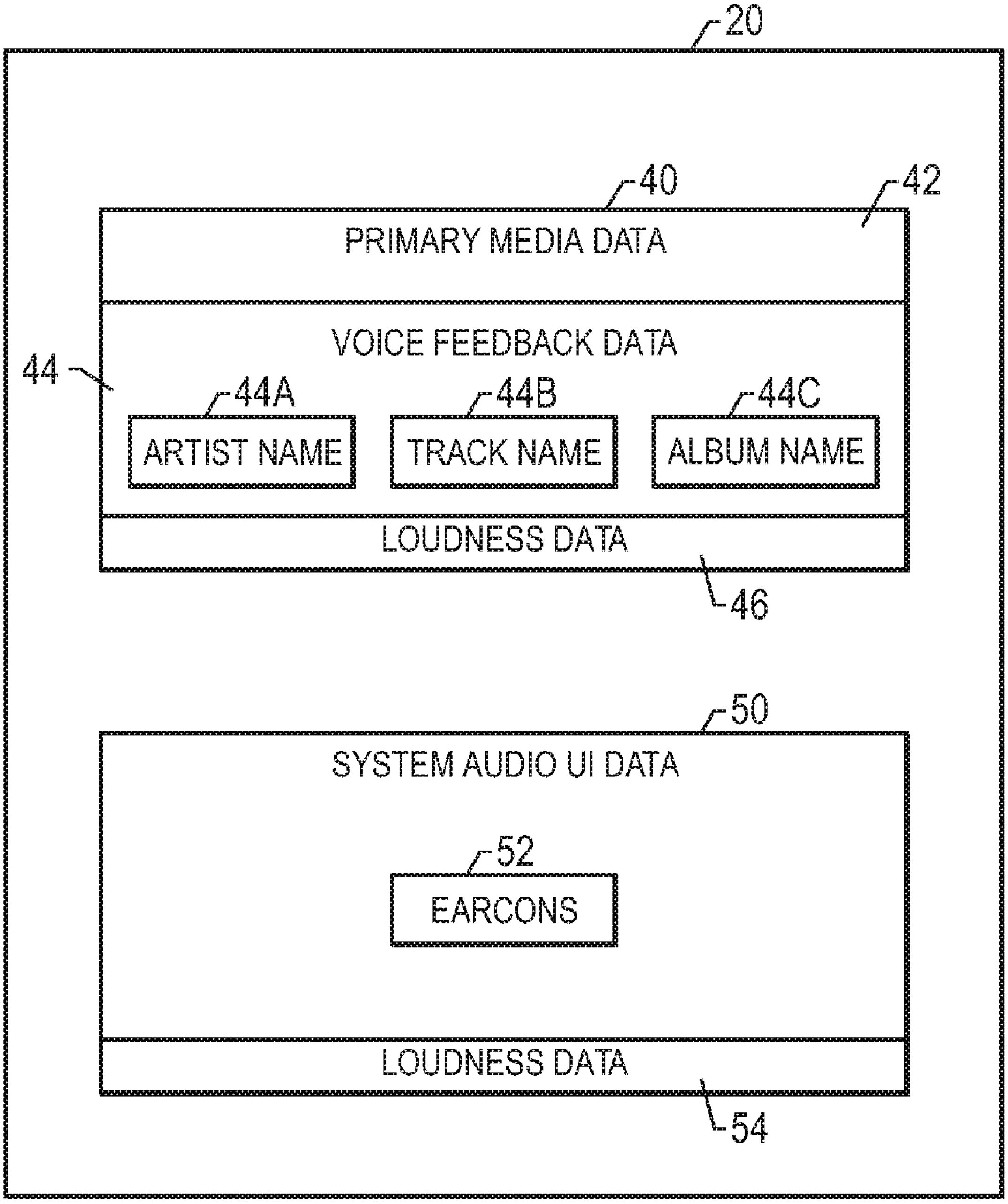
FIG. 2 is a simplified representation of types of audio data that may be stored on and played back using the electronic device of FIG. 1, in accordance with aspects of the present disclosure.

Referring now to FIG. 2, a schematic representation is illustrated showing various types of audio data that may be stored in storage 20 of device 10. For instance, storage 20 may store one or more enhanced media data items 40. Enhanced media item 40 may include primary media data 42 (e.g., a song file, audiobook, etc.) and voice feedback data 44. Voice feedback data 44 may be created using any suitable technique. For instance, in one embodiment, a voice synthesis program may generate synthesized speech data for announcing an artist name (44*a*), a track name (44*b*), and an album name (44*c*) corresponding to primary media data 42 based upon metadata information associated with primary media data 42. Thus, in response to a feedback event (e.g., track change), one or more of these announcements 44*a*, 44*b*, and 44*c*, may be played back as voice feedback. As will be appreciated, the selection of voice feedback data may be configured via a set of user preferences or options stored on device 10.

As shown in FIG. 2, storage 20 may also store system audio user interface (UI) data 50, which, as discussed above, may be part of an audio user interface for device 10. Particularly, system audio UI data 50 may include one or more earcons, referred to here by reference number 52. By way of example, earcons 52 may provide audio information pertaining to the status of device 10. For instance, earcons 52 may include system event or status notifications (e.g., a low battery warning tone or message). Additionally, earcons 52 may include audio feedback relating to user interaction with a system interface, and may include sound effects, such as click or beep tones as a user selects options from and/or navigates through a user interface (e.g., a graphical user interface).

In the depicted embodiment, enhanced media data 40 and system audio UI data 50 may each further include associated loudness data, referred to by reference numbers 46 and 54, respectively. Although shown separately from the schematic blocks representing primary 42 and secondary media data items (e.g., voice feedback data 44 or earcons 52), it should be understood that these loudness values may be associated with their respective files. For example, in one presently contemplated embodiment, respective loudness values may be stored in metadata tags of each primary 42, voice feedback 44, or earcon 52 file. Those skilled in the art will appreciate that such loudness values may be obtained using any suitable technique, such as root mean square (RMS) analysis, spectral analysis (e.g., using fast Fourier transforms), cepstral processing, or linear prediction. Additionally, loudness values may be determined by analyzing the dynamic range compression (DRC) coefficients of certain encoded audio formats (e.g., ACC, MP3, MP4, etc.) or by using an auditory model. The determined loudness value, which may represent an average loudness value of the media file over its total track length, is subsequently associated with a respective media file. As will be discussed further below, in some embodiments, the determination of a secondary audio mixing profile, in addition to being based on the type of audio output device 32 coupled to device 10, may further be based upon loudness data 46 or 54. Further, in some instances, loudness data 46 or 54 may also be used to select equalization transfer functions that may be applied to primary and secondary audio streams, respectively, during playback.

Before continuing, it should be noted that while enhanced media data items 40 (including primary media data 42 and voice feedback data 44) are shown as being stored in storage 20 of device 10, in other embodiments, primary media data 42 and voice feedback data 44 may be streamed to device 10, such as via a network connection provided by network device 24, as discussed above. In other words, audio data does not necessary need to be stored on device 10 on a long-term basis.

Figure 3:
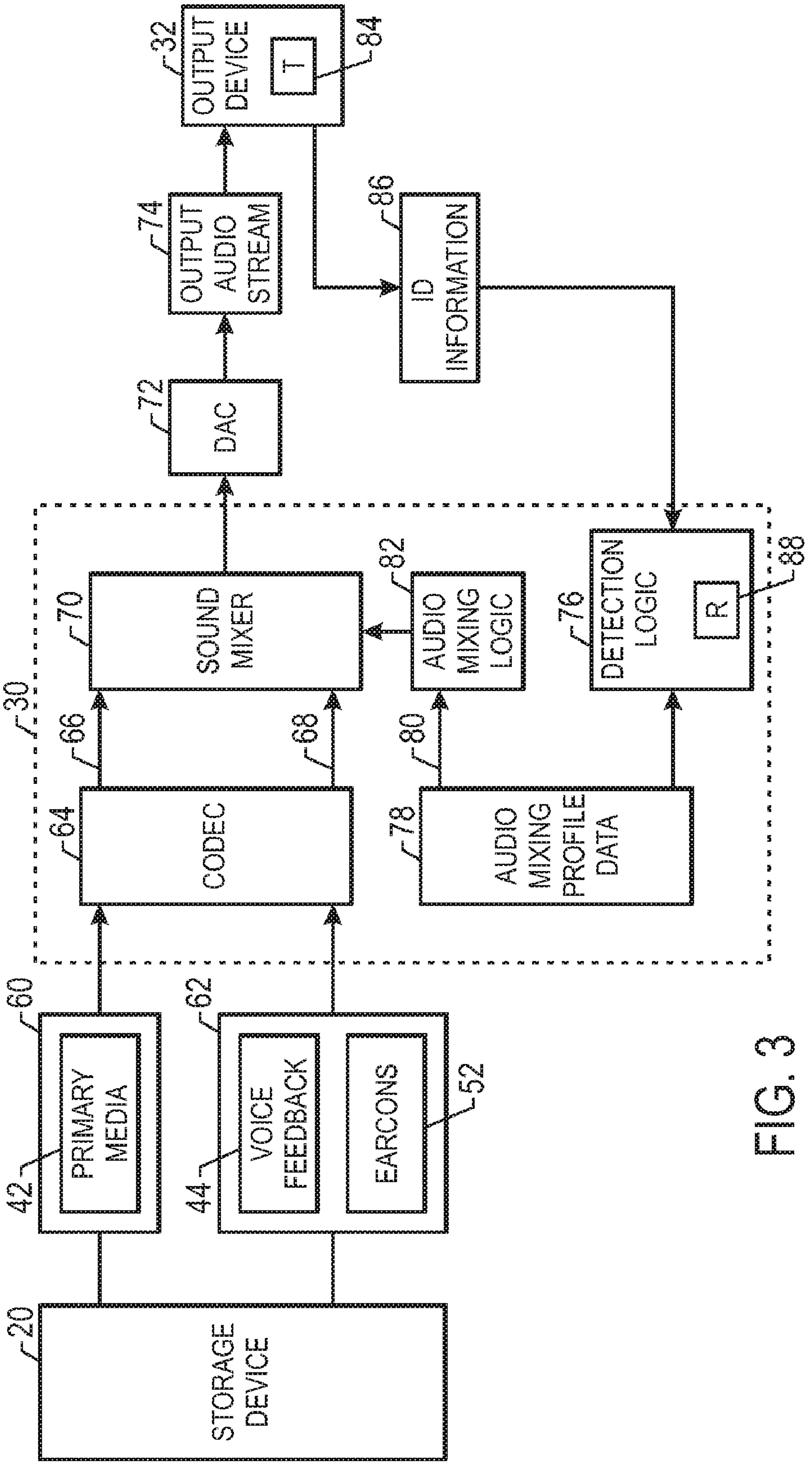
FIG. 3 is a more detailed block diagram of the audio processing circuitry of FIG. 1, in accordance with aspects of the present disclosure.

Referring now to FIG. 3 is more detailed view of an example of audio processing circuitry 30 is illustrated, in accordance with one embodiment. As shown, audio processing circuitry 30 may be configured to receive and process primary audio stream 60 (which may represent the playback of primary media data 42) and secondary audio stream 62 (which may represent the playback of either voice feedback data 44 or earcons 52) from storage 20. As will be appreciated, audio processing circuitry 30 may process primary audio stream 60 and secondary audio stream 62 concurrently, such that output audio stream 74 produced by audio processing circuitry 30 represents a composite mixed output stream. Additionally, audio processing circuitry 30 may also process primary audio stream 60 and secondary audio stream 62 separately (e.g., not played back concurrently), such that output audio stream 74 represents only primary media data or secondary media data.

As mentioned above, secondary audio data is typically retrieved upon the detection of a particular feedback event that triggers or initiates the playback of the secondary audio data. For instance, a feedback event may be a track change or playlist change that is manually initiated by a user or automatically initiated by a media player application (e.g., upon detecting the end of a primary media track). Additionally, a feedback event may occur on demand by a user. For instance, a media player application running on device 10 may provide a command that the user may select in order to hear voice feedback 44 while primary media data 42 is playing.

Additionally, where secondary audio stream 62 represents an earcon 52 that is not associated with any particular primary media file 42, a feedback event may be the detection a certain device state or event. For example, if the charge stored by power source 26 (e.g., battery) of device 10 drops below a certain threshold, earcon 52 may be played to inform the user of a low-power state of device 10. In another example, earcon 52 may be a sound effect (e.g., click or beep) associated with a user interface and may be played back via secondary audio stream 62 as a user navigates the interface. Thus, it should be understood that earcons 52 may be played back based on a state of device 10, regardless of whether primary media data 42 is being played concurrently. As will be appreciated, the use of voice feedback 44 and earcons 52 with device 10 may be beneficial in providing a user with information about a primary media item 42 or about a particular state of device 10. Further, in an embodiment where device 10 does not include display 28 and/or a graphical interface, a user may rely extensively (sometimes solely) on voice feedback 44 and earcons 52 to interact with or operate device 10. By way of example, a model of device 10 that lacks a display and graphical user interface may be a model of an iPod Shuffle®, available from Apple Inc.

As shown in FIG. 3, audio processing circuitry 30 may include coder-decoder component (codec) 64 and mixer 70. Codec 64 may be implemented via hardware and/or software, and may be utilized for decoding certain types of encoded audio formats, such as MP3, AAC or AACPlus, Ogg Vorbis, MP4, MP3Pro, Windows Media Audio, or any suitable format. The respective decoded audio outputs 66 and 68 (corresponding to primary and secondary audio stream 60 and 62, respectively) may be received by mixer 70. Mixer 70 may be implemented via hardware and/or software, and may, when primary 60 and secondary 62 audio streams are received concurrently, perform the function of combining two or more electronic signals into a composite output signal. Additionally, if only a single audio stream (e.g., primary audio stream 60 or secondary audio stream 62) is received by audio processing circuitry 30, then mixer 70 may process and output the single stream. As shown, the output of mixer 70 may be processed by digital-to-analog conversion (DAC) circuitry 72, which may convert the digital data representing the input audio streams 60 and 62 into analog signals, as shown by output audio stream 74. When received and outputted by audio output device 32, output audio stream 74 may be perceived by a user of device 10 as an audible representation of primary media stream 60 and/or secondary media stream 62.

Generally, mixer 70 may include a plurality of channel inputs for receiving respective audio streams (e.g., primary and secondary streams). Each channel may be manipulated to control one or more aspects of the received audio stream, such as tone, loudness, or dynamics, to name just a few. As discussed above, to improve the overall user experience with regard to audio playback, a secondary audio mixing profile may be applied to the playback of secondary media data, including voice feedback data 44 and earcons 52. In one embodiment, the secondary audio mixing profile may be selected from a plurality of stored audio mixing profiles 78. The audio mixing profiles 78 may, for each digital level provided by audio processing circuitry 64 and DAC circuitry 72, define a digital gain value that is to be applied to secondary media stream 62. By way of example only, an audio system of device 10 may provide for 33 digital levels, each corresponding to a particular output gain. For example, where 33 digital levels are provided, level 1 may correspond to the highest gain (e.g., loudest volume setting) and level 33 may correspond to the lowest gain (e.g., quietest volume setting perceived as substantial silence). Thus, each incremental increase or decrease action with regard to a volume control function of device 10 may step the output gain to a value that corresponds to the next digital level, which may be an increase or decrease from the previous output level depending on the direction of the volume adjustment. It should be appreciated that 33 levels are provided merely as an example of one possible implementation, and that fewer or more digital levels may be utilized in other embodiments.

In the depicted embodiment, a secondary audio mixing profile, referred to by reference number 80, may be selected from the stored audio mixing profiles 78 based upon the particular type of output device 32 to which output audio stream 74 is directed. For example, output device 32 may include transmitter 84 which may provide identification information 86 to receiver 88 of detection logic 76. In one embodiment, transmitter 84 and receiver 88 may operate based upon a communication protocol, such that identification information 86 is automatically sent to receiver 88 of detection logic 76 upon detecting the connection of output device 32 to device 10. Based upon the identification information 86, an appropriate audio mixing profile 80 that may define a digital gain curve that provides an optimal playback when output stream 74 is directed to the identified output device 32 may be selected and applied to audio mixing logic 82.

Mixing logic 82 may include both hardware and/or software for controlling the processing of primary 60 and secondary 62 audio streams by mixer 70. Particularly, based upon selected audio mixing profile 80, mixing logic 82 may apply a digital gain to secondary audio stream 62 based upon the current digital level (e.g., levels 1-33). In one embodiment, mixing logic 82 may implemented in a dedicated memory (not shown) for audio processing circuitry 30, or may be implemented separately, such as in main memory 18 (e.g., as part of the device firmware) or as an executable program stored by storage device 20, for example.

In accordance with the presently disclosed techniques, the application of a digital gain to a secondary media stream based upon a mixing profile that takes into account characteristics of an audio output device may provide for an enhanced overall user experience by improving the audibility of secondary media data, as well as increasing the comfort level from the perspective of a user. Additionally, as will be discussed further below, equalization transfer functions that may be applied to each of primary 60 and secondary 62 audio streams may also be selected based upon an output device and, in some embodiments, also based upon loudness values (e.g., 46 and 54) associated with primary and secondary audio data. Further, where primary and secondary audio streams 60 and 62 are being played back concurrently, mixing logic 82 may be further configured to apply a certain amount of ducking or attenuation to the primary audio stream 60 for the duration in which secondary audio stream 62 is played in order to further improve audibility. In some embodiments, ducking may also be applied to the secondary audio stream 62 (though generally to a lesser extent relative to the primary audio stream) in order to ensure that the composite audio signal does not exceed a particular combined gain threshold, such as an operating limit of output device 32. These and other various audio mixing techniques will be explained in further detail with reference to the method flowcharts and graphical illustrations provided in FIGS. 4-9 below.

Figure 4:
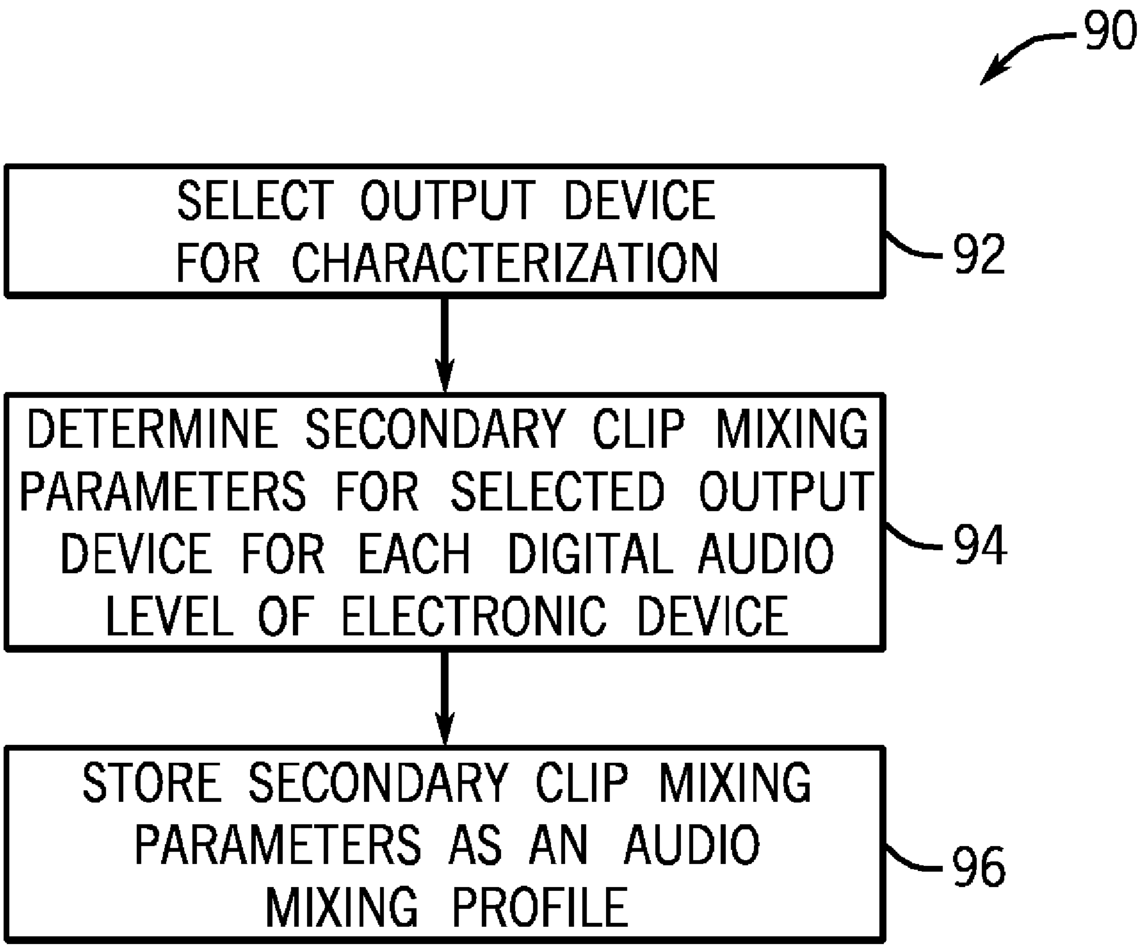
FIG. 4 is a flowchart depicting a method for determining and storing a secondary audio mixing profile based upon an audio output device, in accordance with aspects of the present disclosure.

Referring now to FIG. 4, a flowchart that depicts a method 90 by which a secondary audio mixing parameters may be obtained and stored on device 10 as a mixing profile is illustrated. As discussed above, mixing profiles 78 may be selected based upon the type of output device 32 being used with device 10 to substantially optimize the playback of secondary media data. For instance, a selected mixing profile 78 may be applied to audio mixing logic 82 and mixer 70 during playback of secondary audio stream 62.

Method 90 begins at step 92, in which an output device is selected for characterization. By way of example, the selected output device may be output device 32, and may include speakers or various types and models of headphones, including in-ear, on-ear, or ear bud headphones. Next, at step 94, based upon the selected output device from step 92, mixing parameters for secondary audio clips may be determined for each digital level of device 10. As discussed above, mixing parameters may include a determined digital gain value for each digital audio level provided by audio processing circuitry 30 and DAC circuitry 72. By way of example, such parameters may be determined using empirical data obtained from one or more rounds of user feedback for a particular output device. For instance, secondary media data may be evaluated by one or more users at each digital audio level, and a corresponding digital gain may be selected at each digital level that is intended to substantially optimize the playback of the secondary media data using the selected output device from the viewpoint of the user. As will be appreciated, the digital gain may be positive or negative. For example, with reference to the 33 levels discussed above, at lower gain levels (e.g., corresponding to higher numbered digital levels), a positive digital gain may be desired in order to boost the audibility of the secondary clip, which may be voice feedback data 44 or earcon 52, for instance. At higher gain levels (corresponding to lower numbered digital levels), a negative digital gain may be selected, such that the secondary clip is at least partially attenuated during playback at a corresponding digital level in order to prevent the clip from being "too loud," thus causing user discomfort or, in some extreme cases, damaging output device 32.

Once desired digital gain values have been selected for each digital level, a secondary audio mixing profile (also referred to herein as a "clip mixing profile") that corresponds to the particular selected output device from step 92 may be stored on device 10 (e.g., with mixing profiles 78), such as in memory 18, storage 20, or a dedicated memory of audio processing circuitry 30. By way of example, the mixing profile may be stored in the form of a look-up table. As will be appreciated, method 90 may be repeated for a variety of output device models from different manufacturers.

Figure 5:
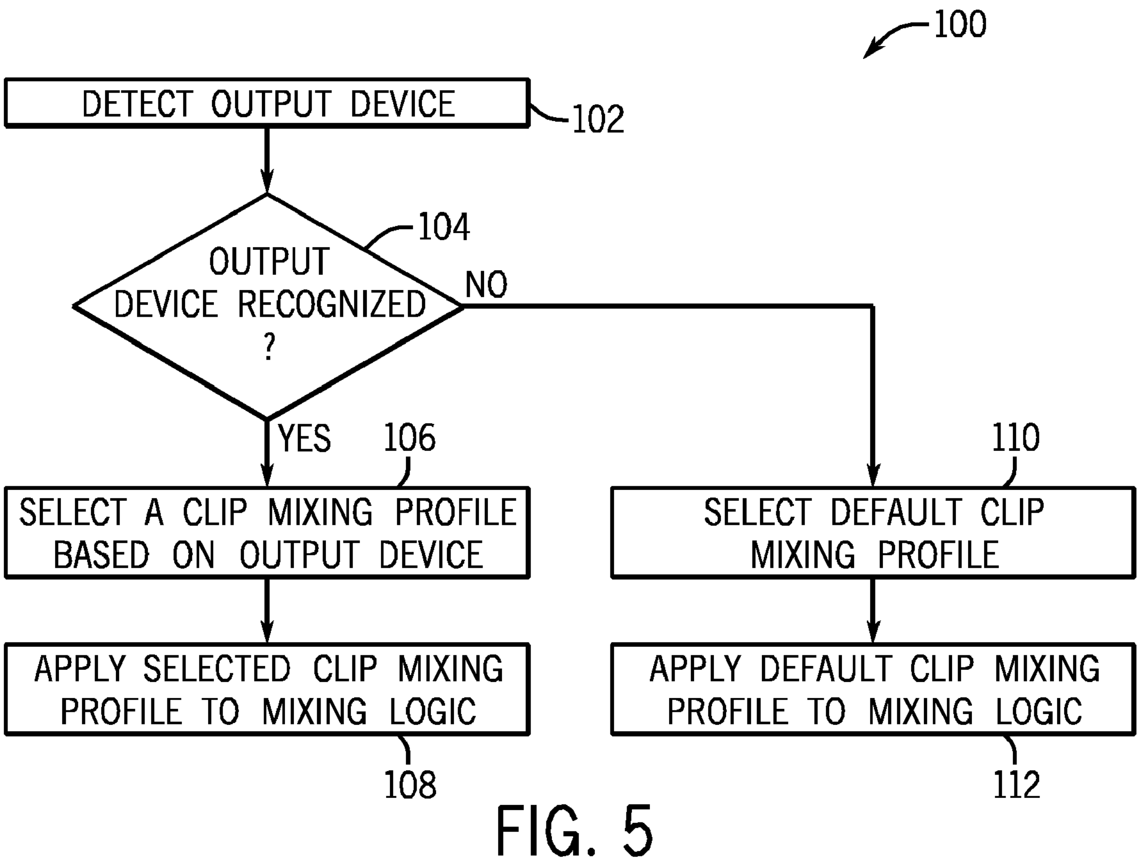
FIG. 5 is a flowchart depicting a method for selecting a secondary audio mixing profile that corresponds to a detected audio output device, in accordance with aspects of the present disclosure.

Continuing to FIG. 5, a method 100 is illustrated depicting a process for selecting a clip mixing profile, in accordance with aspects of the present disclosure. Beginning at step 102, the connection of audio output device 32 to device 10 is detected. For instance, the connection may occur via insertion of an audio-plug end of output device 32 into a headphone jack (e.g., one of I/O ports 12) on device 10. Once output device 32 has been detected, method 100 continues to decision logic 104, in which a determination is made as to whether output device 104 is recognized as an output device that has a corresponding mixing profile (e.g., previously characterized by method 90 of FIG. 4). In one embodiment, step 104 may include receiving (via receiver 88) identification information 86 from a transmitter 84 within output device 32. Based on received identification information 86, detection logic 76 of audio processing circuitry 30 may be configured to determine whether the stored clip mixing profiles 78 include a clip mixing profile that corresponds to the particular identified output device 32. If it is determined at step 104 that a corresponding clip mixing profile is available, the clip mixing profile is selected (80) at step 106. Thereafter, at step 108, the selected clip mixing profile 80 is applied to mixing logic 82, which may apply corresponding digital gain values to secondary media data (e.g., voice feedback or earcons) processed by audio processing circuitry 30.

Returning to decision logic 104 of method 100, if it is determined that a corresponding clip mixing profile is not available for the particular identified output device 32, method 100 may continue to step 110, wherein a default clip mixing profile is selected, and subsequently applied to mixing logic 82 at step 112. As will be appreciated, a default mixing profile may provide for some degree of digital gain adjustments with regard to secondary audio stream 62, though such adjustments may not have been substantially optimized for the particular output device 32 (e.g., via empirical testing data and user feedback).

Figure 6:
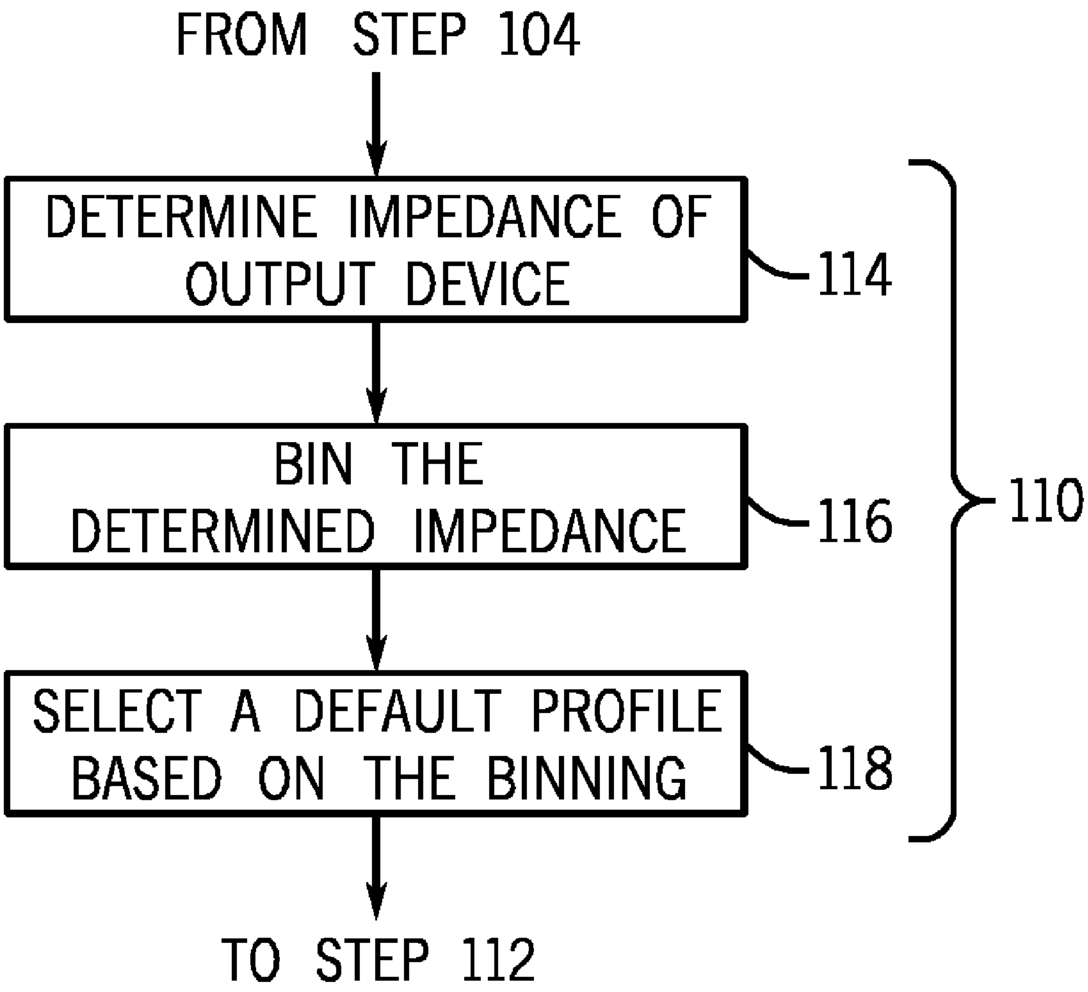
FIG. 6 is a flowchart depicting a method for selecting a default secondary audio mixing profile, in accordance with aspects of the present disclosure.

Referring to FIG. 6, an embodiment for performing step 110 of FIG. 5 is illustrated, in accordance with aspects of the present disclosure. Particularly, the depicted step 110 provides a method in which the selected default mixing profile may be based at least partially upon an impedance characteristic of output device 32. As shown, the step 110 may begin at step 114, in which the impedance of output device 32 is determined. In one embodiment, detection circuitry 76 may be configured to measure or determine at least an approximate impedance for output device 32 upon detecting a connection (e.g., jacking into one of I/O ports 12) between output device 32 and device 10. For instance, detection logic 76 may supply a current to output device 32 and include one or more signaling mechanisms and/or registers to obtain and store an impedance value of output device 32. At step 116, the determined impedance of output device 32 may be binned. By way of example only, detection circuitry 76 may bin the determined impedance based on a three-level HIGH, MID, and LOW impedance binning scheme, though other embodiments may utilize more or fewer binning levels. Thereafter, at step 118, based upon the bin (HIGH, MID, or LOW), a corresponding default clip mixing profile may be selected. Again, while these default clip mixing profiles may not necessarily substantially optimize the clip mixing with respect to output device 32, they may nevertheless at least partially improve the audibility and user listening comfort across the various digital audio levels (e.g., relative to if no clip mixing profile is applied). Upon completing step 118, step 110 proceeds to step 112, as shown in FIG. 5, in which the selected HIGH, MID, or LOW default clip mixing profile is applied to audio mixing logic 82.

Figure 7:
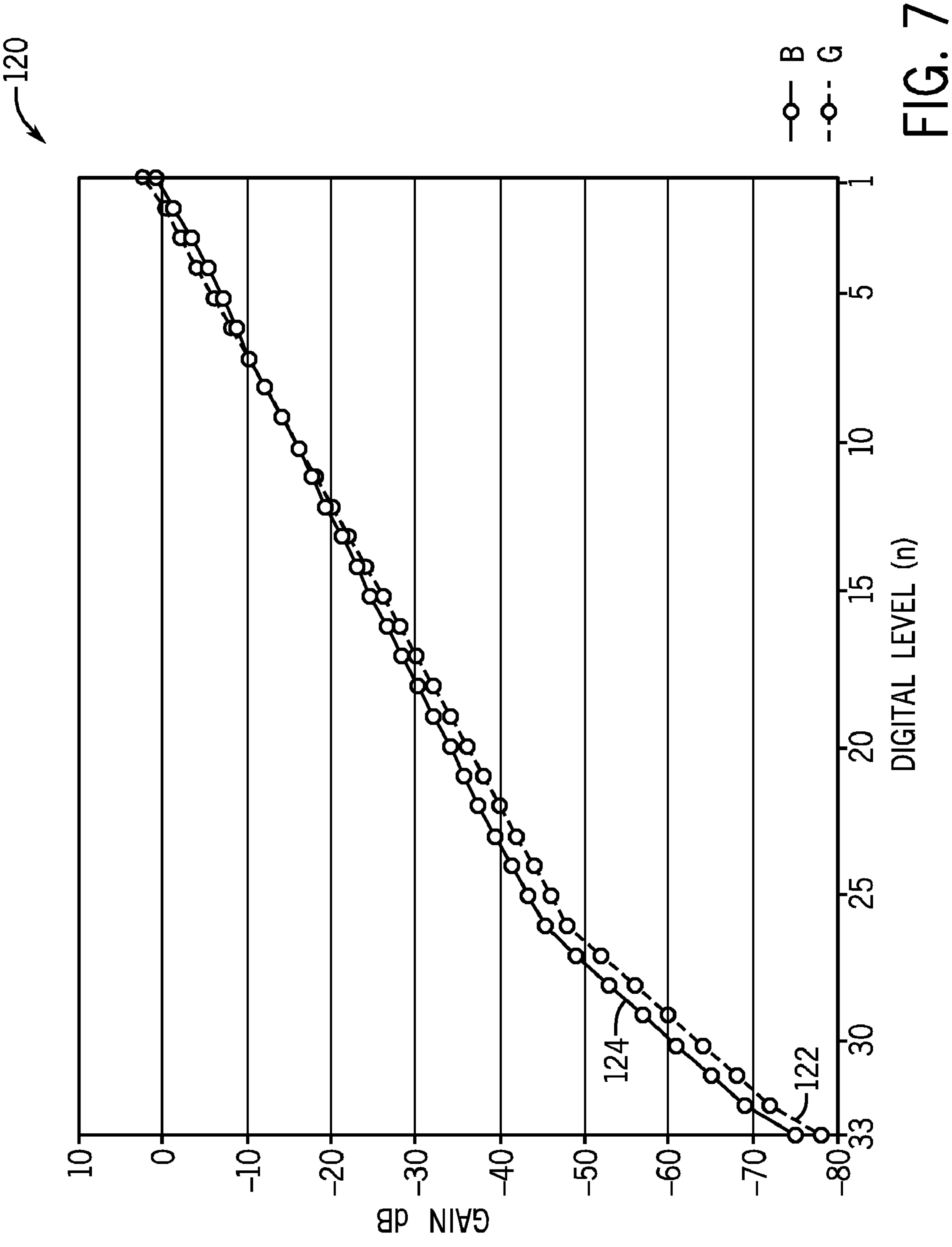
FIG. 7 is a graphical representation of a secondary audio mixing profile, in accordance with one embodiment.

Referring now to FIG. 7, an example of a clip mixing profile that may be applied to mixing logic 82 is illustrated by graph 120, which includes curves 122 and 124. Curve 122 represents default DAC circuitry 72 output gain levels across each digital level (1-33), and curve 124 represents the corresponding digital gain adjustments to be applied at each digital level (1-33). The data represented by curves 122 and 124 may be further illustrated by the following look-up table below:

TABLE 1

Example of Secondary Clip Mixing Profile

| (1) Digital Level (steps) | (2) Main Level (dB) | (3) Digital Gain Adjustment (dB) | (4) Adjusted Level (dB) |
|---|---|---|---|
| 33 | −78 | 3.01 | −75 |
| 32 | −72 | 3.01 | −69 |

TABLE 1-continued

Example of Secondary Clip Mixing Profile

| (1) Digital Level (steps) | (2) Main Level (dB) | (3) Digital Gain Adjustment (dB) | (4) Adjusted Level (dB) |
|---|---|---|---|
| 31 | −68 | 3.01 | −65 |
| 30 | −64 | 3.01 | −61 |
| 29 | −60 | 3.01 | −57 |
| 28 | −56 | 3.01 | −53 |
| 27 | −52 | 3.01 | −49 |
| 26 | −48 | 2.55 | −45.4 |
| 25 | −46 | 2.55 | −43.4 |
| 24 | −44 | 2.55 | −41.4 |
| 23 | −42 | 2.55 | −39.4 |
| 22 | −40 | 2.55 | −37.4 |
| 21 | −38 | 2.30 | −35.7 |
| 20 | −36 | 2.04 | −34 |
| 19 | −34 | 2.04 | −32 |
| 18 | −32 | 1.76 | −30.2 |
| 17 | −30 | 1.76 | −28.2 |
| 16 | −28 | 1.46 | −26.5 |
| 15 | −26 | 1.46 | −24.5 |
| 14 | −24 | 1.14 | −22.9 |
| 13 | −22 | 0.79 | −21.2 |
| 12 | −20 | 0.79 | −19.2 |
| 11 | −18 | 0.41 | −17.6 |
| 10 | −16 | 0.00 | −16 |
| 9 | −14 | 0.00 | −14 |
| 8 | −12 | 0.00 | −12 |
| 7 | −10 | 0.00 | −10 |
| 6 | −8 | −0.46 | −8.5 |
| 5 | −6 | −0.97 | −7 |
| 4 | −4 | −0.97 | −5 |
| 3 | −2 | −0.97 | −3 |
| 2 | 0 | −0.97 | −1 |
| 1 | 2 | −1.55 | 0.5 |

Particularly, column (1) of Table 1 represents the digital levels mentioned above. Column (2) of Table 1 corresponds to default output gain levels from DAC circuitry 72 for each digital level. Column (3) corresponds to the digital gain adjustments that are applied to secondary media stream 60 at each digital level. Column (4) represents the output gain levels of column 2, but adjusted based upon the values in column (3). Thus, by way of example, referring to digital level 20 on graph 120, the main DAC output gain corresponds to −36 dB. Accordingly, when secondary audio stream 62 is played back at digital level 20, a digital volume adjustment of approximately 2 dB is applied, thus producing an adjusted output gain level of −34 dB. Similarly, at digital level 5, the main DAC output gain of −6 dB is attenuated by −1 dB to provide an adjusted output gain of −7 db. As will be appreciated, the output volume at −6 dB may already be relatively loud with respect to typical human hearing tolerances and, thus, it may be preferable to reduce the gain in order to prevent user discomfort, as discussed above.

When providing a composite mixed output stream based upon concurrent primary 60 and secondary 62 streams, the above-discussed principles may be defined by the following equation:

$$S(x,X,Y,t,n)=G(n)\cdot(a(n)\cdot H1[x,X(t)]+B(n)\cdot(H2[x,Y(t)]), \quad \text{(Equation 1)}$$

wherein: "S" represents the combined composite output signal (e.g., output stream 74); "x" represents the type of the output device; "X" represents the primary audio channel of mixer 70; "Y" represents secondary audio channel of mixer 70; "t" represents time; and n represents the digital level. Further, "G" represents the "default" output gain determined by DAC circuitry 72, as discussed above, and the variables "a" and "B" represent digital volumes applied to the primary and secondary audio channels, respectively. For instance, the values "B," when expressed as a function of digital level "n," may correspond to the values in column (3) of Table 1 above.

Additionally, H1 and H2 correspond to equalization transfer functions that may be applied to each of the primary and secondary audio channels, respectively. In one embodiment, a plurality of equalization transfer functions (e.g., including H1 and H2) may be stored on device 10 as equalization profiles corresponding to each of a number of specific types of audio output devices. Accordingly, in addition to selecting an appropriate clip mixing profile, equalization profiles for each of a primary and/or secondary audio stream (e.g., H1 and H2, respectively) may also be selected based on the specific type of output device 32 being used to output audio data from device 10. By way of example, depending on the frequency response of audio output device 32, it may be desirable to equalize one or more frequencies ranges, which may include boosting and/or filtering one of low, mid, or high ranges, for instance. Moreover, device 10 may also include one or more default equalization profiles that may be selected if a specifically defined equalization profile is not available for a particular audio output device 32. As will be appreciated, although such default profiles may not substantially optimize the listening experience relative to a specifically defined equalization profile (e.g., with respect to audio output device 32), they may nevertheless offer at least some degree of improvement with regard to the user experience relative to not providing an equalization profile or equalization transfer function at all.

Still, in further embodiments, in addition to considering the type of output device 32 being used with device 10, the equalization profiles (H1 and H2) may also be determined, at least partially, based on additional characteristics of the audio data, such as the type of primary audio data being played (e.g., music, speech), the type of secondary audio data being played (e.g., voice feedback or earcon clip), or the loudness values associated with each of the primary or secondary audio data (e.g., loudness values 46 and 54), for example. As will be appreciated, by selecting equalization profiles based on one or more of above-discussed criteria, the overall listening experience may be even further improved.

Figure 8:
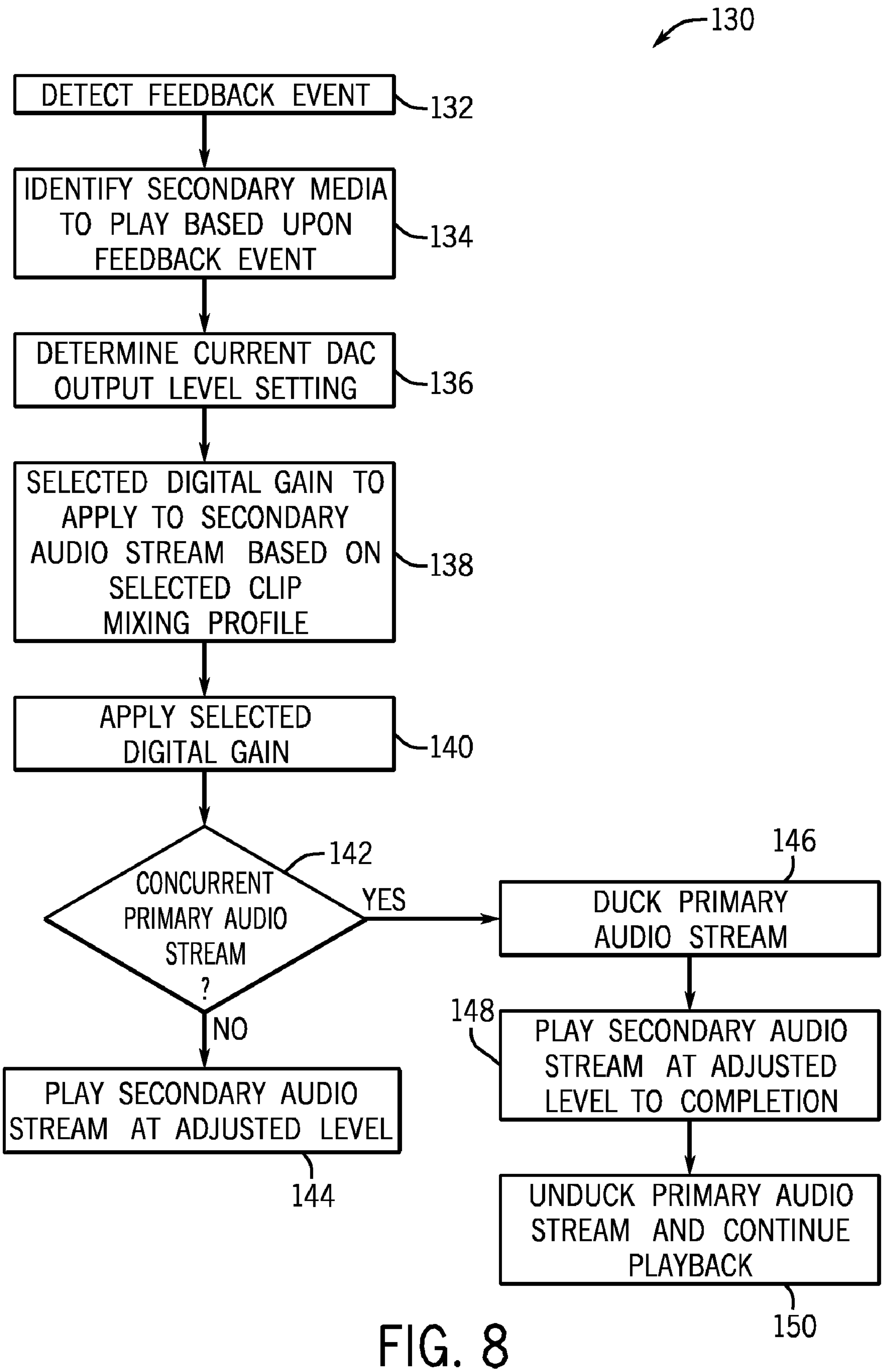
FIG. 8 is a flow chart depicting a method for applying a selected secondary audio mixing profile to a secondary audio stream, in accordance with aspects of the present disclosure.

Referring now to FIG. 8, a method depicting a process for applying digital gain adjustments to a secondary media stream based upon a selected clip mixing profile is illustrated and referred to by reference number 130. As shown, method 130 begins at step 132 with the detection of a feedback event. As discussed above, a feedback event may be any event that triggers the playback of voice feedback clip 44 or earcon 52. For instance, where primary media data 42 is part of enhanced media item 40, voice feedback data 44 may be played in response to a manual request by a user of device 10, upon detecting a track or playlist change, or so forth. Alternatively, where the secondary media is an earcon 52, the feedback event may be a detection of a particular device state that triggers the playback of earcon 52, as discussed above. Thus, depending on the type of feedback event detected, an appropriate secondary media clip may be identified and selected for playback, as shown at step 134.

At step 136 of method 130, the current DAC digital level is determined. As discussed above, a current digital level (e.g., 1-33) may be determined by identifying a current volume setting on device 10. Based on the determined digital level, an appropriate digital volume may be selected from the currently applied clip mixing profile which, as mentioned above, may be selected based upon output device 32, as indicated by step 138. At step 140, the selected digital volume is applied to the secondary audio channel. Following step 140, the remaining steps 142-150 of method 130 illustrate two different scenarios for the playback of the adjusted secondary audio stream. Particularly, method 130 illustrates one scenario in which secondary audio is played back independently without a concurrent primary audio stream, and further illustrates another scenario in which secondary audio is played back concurrently with a primary audio stream.

With the above points in mind and referring now to decision logic 142, a determination is made as to whether concurrent primary media data is being played back with the secondary media data. If it is determined that the secondary audio stream (e.g., 62) is being played back independently, then the secondary audio stream is processed by audio processing circuitry 30 and output to output device 32 at an output level that reflects the digital volume adjustment applied at step 140 above. Thus, this represents a scenario in which the secondary audio stream is being played alone. By way of example, this may occur when an earcon 52 is played back upon detection of a particular device state that occurs while no other audio data is being played.

Returning to decision logic 142, if a concurrent primary audio stream (e.g., 60) is detected, then method 130 branches to step 146, at which the primary audio stream is attenuated or ducked. For instance, ducking may be performed such that the intelligibility of the secondary audio clip may be more clearly discerned by a user/listener. As will be appreciated, any suitable audio ducking technique may be utilized. For example, step 146 may include audio ducking techniques generally disclosed in the co-pending and commonly assigned U.S. patent application Ser. No. 12/371,861, entitled "Dynamic Audio Ducking" filed Feb. 16, 2009, the entirety of which is hereby incorporated by reference for all purposes. Once the primary audio stream is ducked at step 146, method 130 continues to step 148 at which the secondary audio clip is played at an adjusted level that is based upon the digital volume adjustment applied at step 140, as discussed above. Once the playback of the secondary audio clip is completed, the primary audio stream may resume playing at an unducked level, as shown by step 150.

Though not shown in the present figure, in some embodiments, ducking may also be applied to the secondary audio stream (though generally to a lesser extent relative to the primary audio stream) during the period of concurrent playback. For instance, ducking the secondary audio stream may be useful to ensure that the composite audio signal output does not exceed a particular gain threshold that may cause discomfort to a user and/or damage output device 32.

Figure 9:
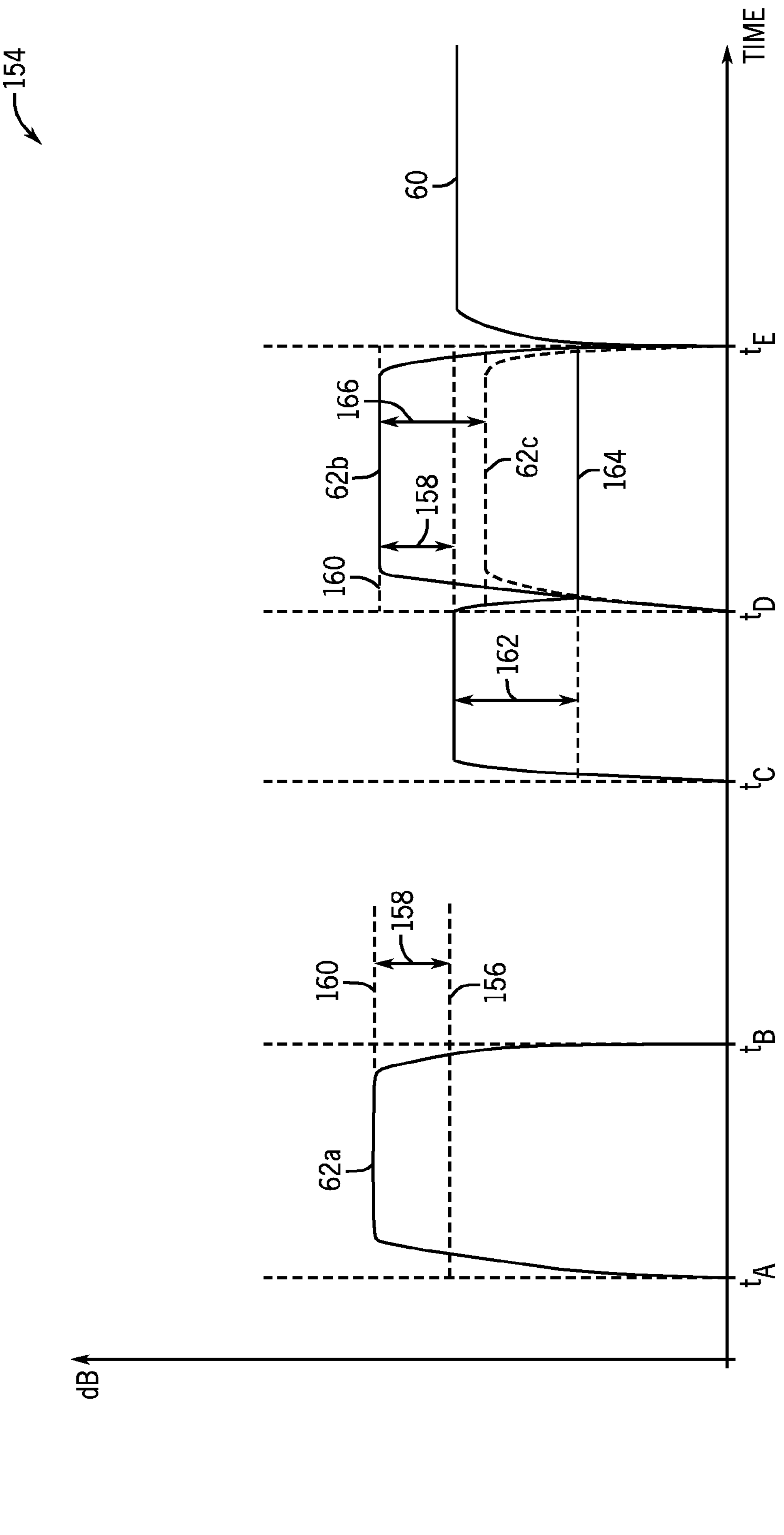
FIG. 9 is a graphical depiction of a technique for applying a selected secondary audio mixing profile to the playback of a secondary audio stream in accordance with the method of FIG. 8.

Continuing to FIG. 9, a graphical depiction 154 showing the playback of secondary media data in each of the scenario depicted by method 130 of FIG. 8 is illustrated. Referring first to curve 62*a*, this curve may represent the playback of a secondary audio clip, such as an earcon, using an applied clip mixing profile 80, but without concurrent primary audio stream 60. As illustrated, playback of secondary audio clip 62*a* begins at time $t_A$. Output gain level 156 represents the default gain at a particular digital level. During playback of secondary audio clip 62*a*, a digital volume 158 may be selected based upon the applied mixing profile. Based on this adjustment, secondary audio clip 62*a* may be output from audio processing circuitry 30 at an adjusted output level 160. For instance, referring to Table 1 above, if the current digital level is 17, the corresponding output gain level 156 would be equivalent to −30 dB, the adjustment digital volume would be approximately 1.76 dB, thus providing an adjusted output level 160 of approximately −28.2 dB during the playback interval of secondary audio clip 62*a* from $t_A$ to $t_B$.

Referring now to curves 60 and 62*b* of graph 154, the second scenario depicted above in FIG. 8 is shown. That is, curve 60 represents a primary audio stream that is played concurrently a secondary audio stream, represented by curve 62*b*. As illustrated, primary audio stream 60 begins playback at time $t_C$. At time $t_D$, a feedback event triggering the playback of secondary audio clip 62*b* occurs, thus initiating the playback of clip 62*b*. Thus, as depicted in graph 154, at time $t_D$, secondary audio clip 62*b* ramps up to output level 160 which, as discussed above, may be determined based on the digital volume adjustment 158 selected from the applied clip mixing profile. Additionally, as mentioned above, during the period (time interval $t_{DE}$) in which primary audio stream 60 and secondary audio stream 62*b* are played concurrently, primary audio stream 60 may be temporarily ducked or attenuated, as indicated by the ducking amount 162 on graph 154. By way of example only, the ducked level (e.g., over time interval $t_{DE}$) may be less than or equal to 90 percent of the unducked output level (e.g., prior to time $t_D$). Thus, during the interval $t_{DE}$, primary audio stream 60 is played back at the ducked level 164 and secondary audio stream 62*b* is played at level 160, based upon the applied clip mixing profile, as discussed above. Further, at the conclusion of the secondary audio clip at time $t_E$, primary audio stream 60 may continue to be played at an unducked level.

As discussed above with reference to FIG. 8, in some embodiments, secondary audio stream may also be ducked (though generally to a lesser extent relative to the primary audio stream) during the period of concurrent playback with a primary audio stream. For example, curve 62*c* on graph 154 depicts a scenario in which a secondary audio clip is also attenuated or ducked during the concurrent playback interval $t_{DE}$. For instance, the determined output level 160 (e.g., by adjusting level 156 by digital volume 158 based upon the selected clip mixing profile) may be ducked by amount 166. Thus, both primary audio stream 60 and secondary audio stream 62*c* are ducked during $t_{DE}$. As mentioned above, ducking the secondary audio stream may be useful to ensure that the composite audio signal output (e.g., 74) does not exceed a particular gain threshold that may cause discomfort to a user and/or damage output device 32.

In one further embodiment, depending on the genre of the primary media data being played, different ducking levels may be utilized. By way of example, where the primary media data being played is primarily a speech-based track, such as an audiobook, those skilled in the art will appreciate that a level of ducking (e.g., 162) that is suitable for a music track while a voice announcement or earcon is being concurrently played, may not yield the same audio perceptibility results when applied to a speech-based track due at least partially to frequencies at which spoken words generally occur. Thus, when a primary audio stream 60 is identified as being primarily speech-based, audio mixing logic 82 provide a second duck level of a greater magnitude that results in the speech-based primary media item being ducked more during the playback of voice feedback data or earcons relative to a music-based primary audio stream.

In yet another embodiment, separate voice feedback and earcon mixing profiles for a particular output device may be provided. That is, audio mixing logic 82 may load both a voice feedback mixing profile and an earcon profile based upon a detected output device 32. As will be appreciated, earcons are typically preloaded onto a device 10 by a manufacturer and may be generally normalized to a particular level. However, as explained above, voice feedback data may be generated on different devices, downloaded from different online providers and, therefore, may not exhibit the same uniformity. Accordingly, separate mixing profiles for voice feedback and earcons may be utilized to further improve the user experience. Thus, depending on the type of secondary media that is played, digital volume adjustment values may be selected from either the voice feedback or the earcon mixing profile and applied to the secondary audio channel.

As will be understood, the various clip mixing techniques described above have been provided herein by way of example only. Accordingly, it should be understood that the present disclosure should not be construed as being limited to only the examples provided above. Indeed, a number of variations of the clip mixing techniques set forth above may exist. Additionally, various aspects of the individually described techniques may be combined in certain implementations. Further, it should be appreciated that the above-discussed secondary audio clip mixing schemes may be implemented in any suitable manner. For instance, the secondary audio clip mixing schemes may be integrated as part of audio mixing logic 82 within audio processing circuitry 30. Additionally, it should be appreciated that audio mixing logic 82 and/or detection logic 76 may be implemented using hardware (e.g., suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:

detecting the presence of an audio output device on an electronic device;

determining whether a secondary audio clip mixing profile corresponding to the audio output device is available;

selecting the clip mixing profile corresponding to the audio output device if the clip mixing profile is available;

applying the selected clip mixing profile to an audio processing circuit; and adjusting an output level of a secondary audio stream processed by the audio processing circuit based upon the secondary audio clip mixing profile.

2. The method of claim 1, comprising:

determining whether an equalization profile corresponding to the output device is available;

selecting the equalization profile corresponding to the audio output device if the equalization profile is available;

applying the selected equalization profile to the audio processing circuit; and adjusting the secondary audio stream based upon the selected equalization profile.

3. The method of claim 2, wherein the selected equalization profile comprises an equalization transfer function, and wherein adjusting the secondary audio stream based upon the selected equalization profile comprises applying a gain to one or more frequencies of the secondary audio stream in accordance with the equalization transfer function.

4. The method of claim 1, wherein adjusting the output level of the secondary audio stream comprises:

determining a current digital audio level;

determining an adjustment value from the selected clip mixing profile that corresponds to the current digital audio level; and adjusting the output level based upon the determined adjustment value.

5. The method of claim 1, wherein determining whether a secondary audio clip mixing profile corresponding to the audio output device is available comprises:

receiving identification information from the audio output device using a receiver;

determining whether the clip mixing profile corresponding to the received identification information is stored on the electronic device; and retrieving the stored clip mixing profile if it is determined that the clip mixing profile corresponding the received identification information is stored on the electronic device.

6. The method of claim 1, comprising:

selecting a default clip mixing profile if the clip mixing profile corresponding to the audio output device is not available; and applying the selected default clip mixing profile to the audio processing circuit.

7. The method of claim 6, wherein the default clip mixing profile is selected from a plurality of available default clip mixing profiles.

8. The method of claim 7, wherein selecting a default clip mixing profile comprises:

sending a current from a detection circuit to the audio output device;

measuring an impedance value for the audio output device;

evaluating the measured impedance value among a plurality of impedance bins, wherein each impedance bin corresponds to a respective one of the plurality of default clip mixing profiles; and selecting one of the plurality of default clip mixing profile based upon the evaluation.

9. The method of claim 8, wherein the plurality of impedance bins comprises at least three different impedance bins, including a high-level impedance bin, a mid-level impedance bin, and a low-level impedance bin.

10. A method, comprising:

detecting a feedback event on an electronic device;

selecting at least one secondary audio item based upon the detected feedback event to output to an audio output device coupled to the electronic device;

determining a current digital level based upon a volume setting of the electronic device;

selecting a digital volume adjustment from a clip mixing profile based upon the determined digital level, wherein the clip mixing profile is selected based upon the audio output device;

adjusting the output level of a secondary audio stream corresponding to the at least one secondary audio item by applying the selected digital volume adjustment; and playing the adjusted secondary audio stream using the audio output device.

11. The method of claim 10, wherein the at least one secondary audio item comprises voice feedback data corresponding to a respective primary audio data item, and wherein the feedback event comprises a track change, a playlist change, or an on-demand request by a user of the electronic device, or some combination thereof.

12. The method of claim 10, wherein the at least one secondary audio item comprises an earcon clip, and wherein the feedback event comprises a detection of a system event, a detection of a system status, or a detection of an interface navigation event, or some combination thereof.

13. The method of claim 10, comprising playing a primary audio stream representing a primary audio item, wherein the primary audio stream and adjusted secondary audio stream are concurrently played for the duration of the secondary audio item.

14. The method of claim 13, wherein outputting the primary audio stream comprises:

playing the primary audio stream at a first output level corresponding to the current digital level based upon default output levels defined by digital-to-analog conversion logic prior to the playback of the adjusted secondary audio stream;

playing the primary audio stream at a second output level for the duration of concurrent playback with the adjusted secondary audio stream, wherein the second output level is attenuated relative to the first output level; and playing the primary audio stream at the first output level after the playback of the adjusted secondary audio stream has ended.

15. The method of claim 14, wherein the second output level less than or equal to 90 percent of the first output level.

16. The method of claim 14, wherein the amount by which the first output level is attenuated is based at least partially upon the genre of the primary audio stream.

17. The method of claim 16, wherein the first output level is attenuated by a first amount if the primary audio stream comprises primarily music-based data, and wherein the first output level is attenuated by a second amount if the primary audio stream comprises primarily speech-based data, wherein the second amount is greater than the first amount.

18. The method of claim 14, wherein during the period of concurrent playback, the adjusted secondary audio stream is attenuated from the adjusted output level to a third output level, wherein the third output level is greater relative to the second output level.

19. An electronic device, comprising:

an audio output device;

a storage device configured store a plurality of primary audio items, secondary audio items, and secondary audio clip mixing profiles, each of the clip mixing profiles corresponding to a specific audio output device; and an audio processing circuit comprising:

a mixer configured to mix a primary audio stream and a secondary audio to produce a composite audio stream, wherein the primary audio stream corresponds to a primary audio item, and wherein the secondary audio stream corresponds to a secondary media item;

a detection circuit configured to detect the type of the audio output device and to select a clip mixing profile based upon the detected type of audio output device; and audio mixing logic configured to apply the selected clip mixing profile to the mixer, wherein the output level of the secondary audio stream is adjusted based upon the selected clip mixing profile.

20. The electronic device of claim 19, wherein the detection logic comprises a receiver configured to communicate with a transmitter in the audio output device using a communication protocol.

21. The electronic device of claim 20, wherein the receiver is configured to receive identification information for the audio output device from the transmitter, wherein the transmitter is configured to automatically send the identification information to the receiver upon connection to the electronic device.

22. The electronic device of claim 19, wherein the secondary audio items comprise one or more of earcons or voice feedback data, and wherein the voice feedback data comprises one or more of artist information, track information, playlist information, or album information, or some combination thereof.

23. The electronic device of claim 22, comprising a memory device configured to store a media player application executable by a processor, wherein the media player application is configured to provide for the playback of primary or voice feedback data in response to inputs from a user of the electronic device.

24. The electronic device of claim 22, wherein the memory device is configured to store an audio user interface executable by a processor, wherein the audio user interface is configured to provide for the playback of earcons in response to a detection of a system event, a system status, or an input from a user of the electronic device, or some combination thereof.

25. The electronic device of claim 24, wherein the electronic device does not comprise a display.

26. The electronic device of claim 19, wherein the detection circuit is configured to select a equalization profile for the secondary audio stream, wherein the selection of the equalization profile is based at least partially upon one of the detected type of audio output device, the type of secondary audio data being played in the secondary audio stream, or the loudness value associated with the secondary audio data, or some combination thereof.

27. A method, comprising:

detecting the presence of an audio output device on an electronic device;

identifying each of an earcon clip mixing profile and a voice feedback clip mixing profile based upon the detected audio output device;

applying both of the earcon clip mixing profile and the voice feedback clip mixing profile to an audio processing circuit;

determining whether a secondary audio stream comprises earcon data or voice feedback data;

adjusting the output level of the secondary audio stream using the earcon clip mixing profile if the secondary audio stream comprises earcon data; and adjusting the output level of the secondary audio stream using the voice feedback clip mixing profile if the secondary audio stream comprises voice feedback data.

28. The method of claim 27, comprising selecting an equalization transfer function to apply to the secondary audio stream based at least partially upon the detected audio output device.

29. The method of claim 28, wherein the selection of the equalization transfer function is additionally based on one or more of whether the secondary audio stream comprises earcon data or voice feedback data or a loudness value associated with a secondary audio item represented by the secondary audio stream.

30. One or more tangible, computer-readable storage media having instructions encoded thereon for execution by a processor, the instructions comprising:

code to detect a type of an audio output device coupled to an electronic device;

code to select a secondary audio clip mixing profile based upon the detected type of the audio output device; and code to play a secondary audio stream at an adjusted output level based upon the selected clip mixing profile.

31. The one or more tangible, computer-readable storage media of claim 30, wherein the code for playing the secondary audio stream at an adjusted output level based upon the selected clip mixing profile comprises:

code to determine a current digital audio level;

code to access a look-up table storing the selected clip mixing profile;

code to select a digital volume adjustment value from the look-up table corresponding to the current digital audio level; and code to adjust the output level of the secondary audio stream based upon the digital volume adjustment value.

* * * * *